United States Patent [19]

Larsson

[11] Patent Number: 4,582,193
[45] Date of Patent: Apr. 15, 1986

[54] FLIGHT ATTACHED TO A DRIVE MECHANISM

[75] Inventor: Karl H. Larsson, Monrovia, Calif.

[73] Assignee: Bivans Corporation, Los Angeles, Calif.

[21] Appl. No.: 391,398

[22] Filed: Jun. 23, 1982

[51] Int. Cl.⁴ .............................................. B65G 17/08
[52] U.S. Cl. ................................ 198/803.01; 198/853
[58] Field of Search ............ 198/648, 851, 853, 803.01

[56] References Cited

U.S. PATENT DOCUMENTS

| 2,954,113 | 9/1960 | Hibbard et al. | 198/189 |
| 3,231,069 | 1/1966 | Lanham | 198/853 |
| 4,033,450 | 7/1977 | Paddock et al. | 198/648 |

FOREIGN PATENT DOCUMENTS 1168030  10/1969  United Kingdom ................. 198/853

OTHER PUBLICATIONS

Rexnord Catalog, R74 including pp. 144, 145, 148 and 149.

Primary Examiner—Joseph E. Valenza
Assistant Examiner—Stuart J. Millman
Attorney, Agent, or Firm—Poms, Smith, Lande & Rose

[57] ABSTRACT

A flight which is attached to a drive mechanism such as a chain is disclosed. The flight may be used to form a conveyor for transporting articles, when a series of flights are attached to the drive mechanism in succession. The disclosed flight includes a horizontal slot in its forward support element which is slipped onto a pin on the drive mechanism, and a rear support element having a vertical slot with a detent, which is snapped onto a succeeding pin as the flight is rotated downward around the forward support pin in the horizontal slot of the forward support element, acting as a pivot. Attachment and detachment is very simple, requiring no special tools. The forward and rear support elements are in different vertical zones or planes, so that the forward support element of one flight may be attached to the same pin as the rear support element of an adjacent flight. This allows the flight to be used with double pitch as well as single pitch chains. Because of the horizontal slot in the forward support element and the overlapping of the forward and rear support elements on a single pin, the flight does not tend to pop off when experiencing stresses in its working environment.

7 Claims, 10 Drawing Figures

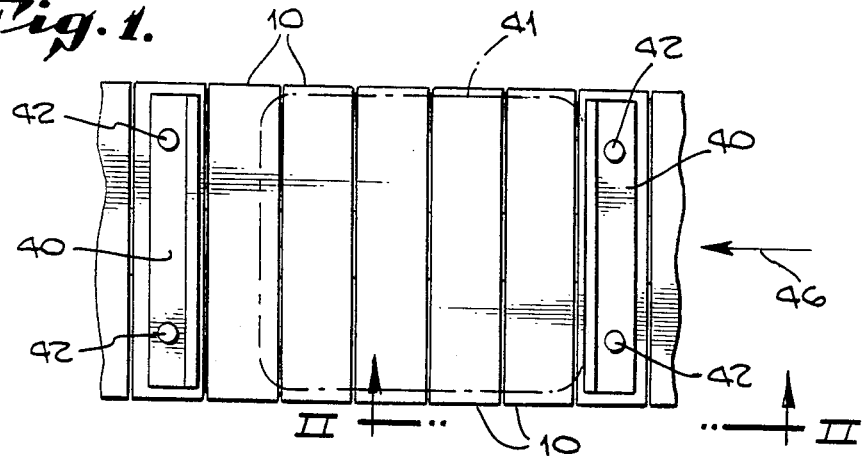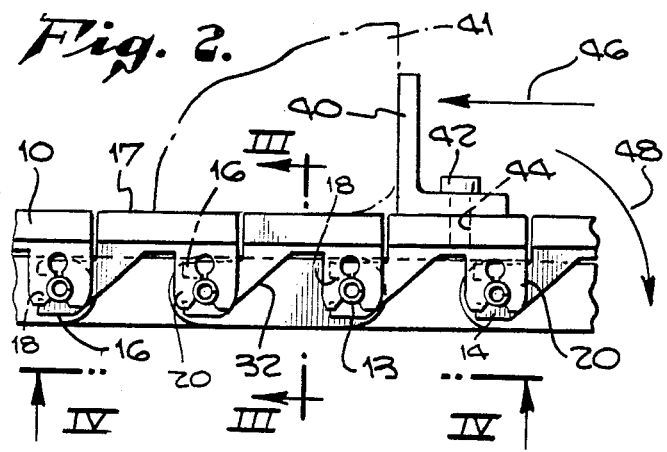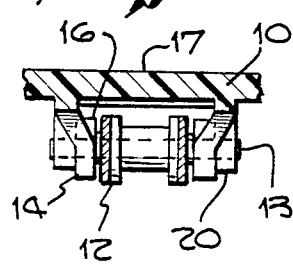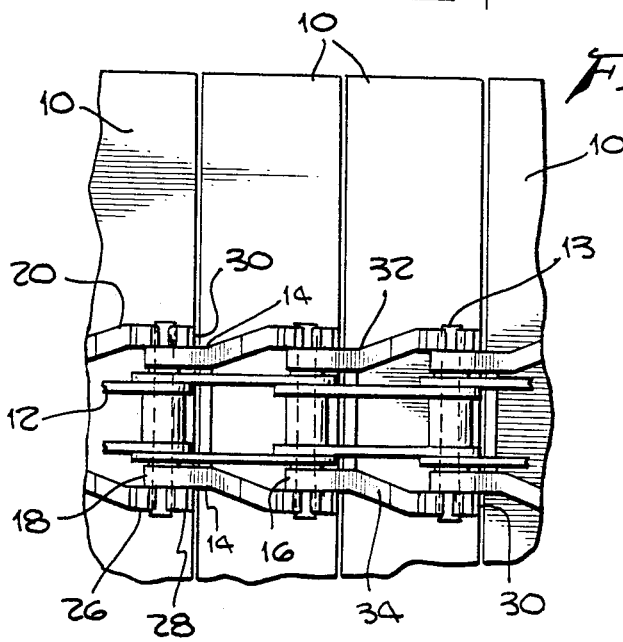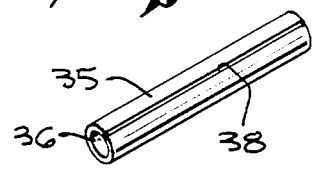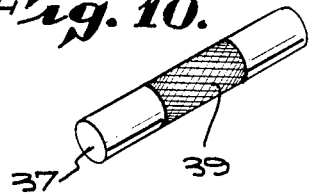

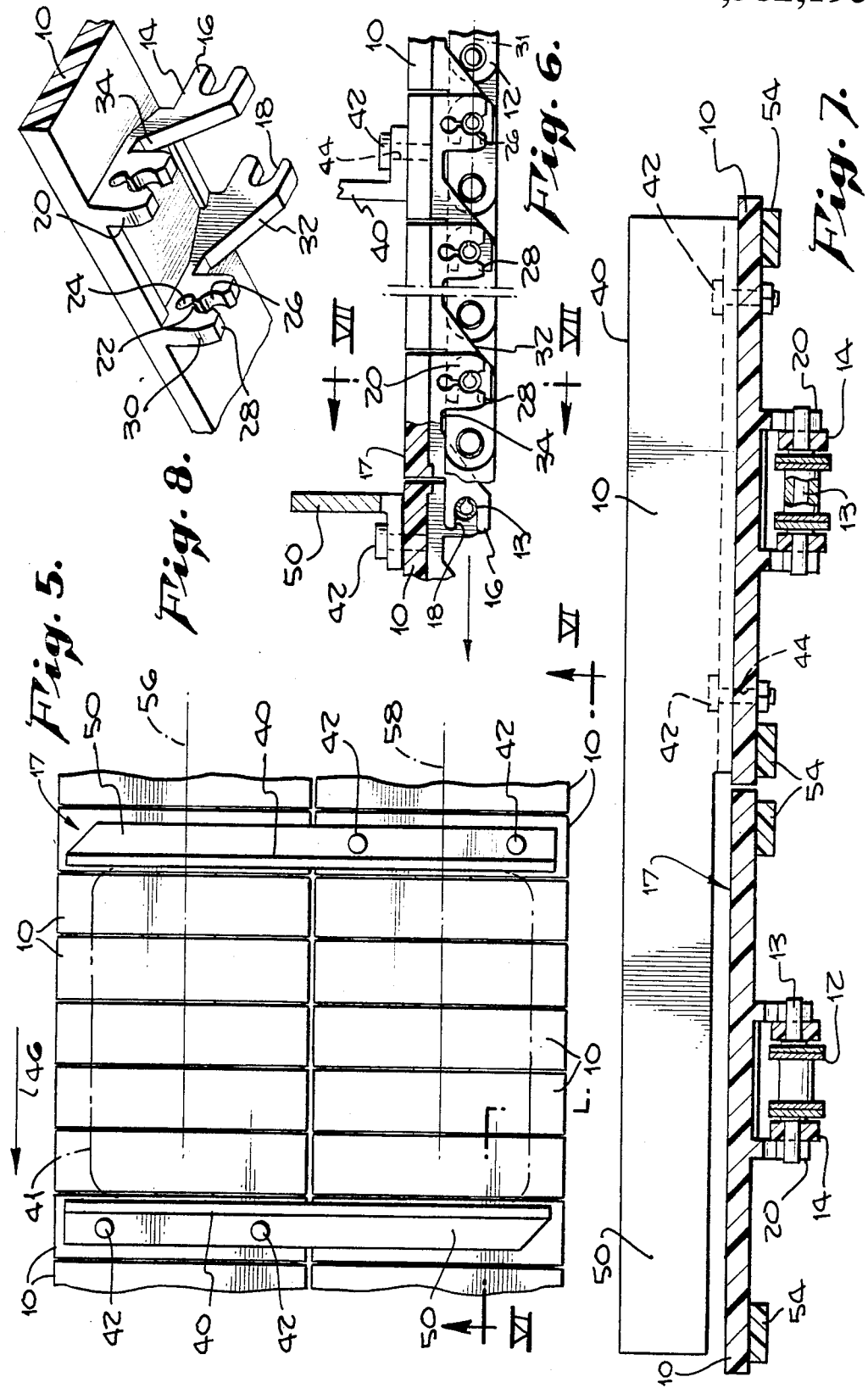

FLIGHT ATTACHED TO A DRIVE MECHANISM

FIELD OF THE INVENTION

This invention relates in general to conveyor apparatus including individual plastic molded flights mounted to a single conveyor chain or to a plurality of spaced parallel chains, and more particularly to the flight construction and a method of assembly and retention of the individual flights to the chains.

BACKGROUND OF THE INVENTION

Conveyor apparatus are widely used currently in automated machinery for transporting products or work pieces from one location to another automatically and repetitively with minimal operator control or observation. It is thus important that the conveyor construction be durable and reliable, and if damaged, easily and quickly repairable with readily available parts. Such conveyors in the past have employed specially fabricated chains to which individual platforms, or flights, are attached, and which chains are considerably more expensive than the standard roller chain which may be used with the present invention. In one prior art conveyor, small metal mounting tabs have been extending sideways beyond the chain side plates with the flights being fastened to the tabs. In another conveyor construction, the chain has been specially fabricated with laterally projecting pins extending sideways beyond its chain side plates to receive plastic molded flights having parallel depending legs with opposed inwardly opening apertures to mount the flight to its pins in a mechanical detented assembly. These conveyors have required specially manufactured chains which might not be readily available where a conveyor chain breaks in operation, and have not provided a method and construction for flight attachment to the chain which is both easily assembled to or from a standard roller chain and securely held in place during use of the combined chain and flights used as a conveyor.

Accordingly, the principal objects of the present invention are to provide a conveyor flight which can be used in conjunction with commercially available roller chain, and which is easily attachable and removable from the chain without the use of special tooling, while at the same time remaining securely fastened to the chain while in operation. In addition, the mounting pins which accept said flights can be one of several commercially available pins.

SUMMARY OF THE INVENTION

In a broad aspect of the invention, a flight having a body including an upper surface is provided with rear support means which are removably attached to a first support or mounting pin of a chain, and forward support means removably attached to a second support or mounting pin of the conveyor chain wherein the mounting pins may be resilient roll pins press-fitted into the hollow chain pins of the standard roller chain, or solid pins otherwise affixed.

Stated more particularly, the forward support means includes a horizontal slot which is slip-fitted to a mounting pin which extends sideways in both directions from the centerline of the conveyor chain, and the rear support means includes a vertical slot which is also slip-fitted over another pin and pressed down in a preferred embodiment to provide a snapped-in-position friction fit with its corresponding pin. In practice, the forward support means are attached first, and then the flight is rotated downwardly around the forward pin acting as a pivot point. The rear support means is fabricated and affixed to the flight body in such a way that as the flight is rotated, the opening of the vertical slot in the rear support means makes contact with its corresponding pin, and as further pressure is applied downwardly to the flight body, the vertical slot is frictionally fitted and snapped into position over its corresponding pin. Attachment is therefore quite simple because the flight is essentially self-positioning, no tools are required, and the vertical slot is so constructed that hand pressure is sufficient to achieve the desired friction fit.

Additionally, the forward and rear support means are located in different vertical zones or planes, so that the forward support means of one flight, and the rear support means of an adjacent flight may be attached to the same pin in juxtaposition. This aspect has a number of advantages, including the fact that when the forward and rear support means overlap, one assists the other in holding it in place and preventing slippage from the drive mechanism. Furthermore, a flight having this construction is adaptable for use on either single-pitch or double-pitch chain, whereas the previously available flights or top plates could only be used on more costly single-pitch chains.

Stated more particularly, the forward support means includes an extension, in which the horizontal slot is located, which extends forward of the upper surface of the flight to which it is attached, and under the upper surface of the forward adjoining flight, and there engages a pin forward of the upper surface of its associated flight. The rear support means of the preceding flight is, therefore, affixed to this same pin, and the upper surface of the flight body associated with the subject rear support means does not interfere with the upper surface of said forward adjoining flight.

In accordance with another aspect of the invention, the rear support means includes resilient legs which separate when the rear support means is pressed downwardly onto its supporting pin, to provide a tight friction fit. Also included is a stress relief means at the end of the vertical slot so that as a flight is attached or removed and the legs in the rear support means experience flexion, the stress at the end of the vertical slot is relieved to prevent failure.

In accordance with another aspect of the invention, a holding means is provided in the vertical slot to securely grip a pin and to maintain the upper surface of the flight body in a specific horizontal position when it is properly attached to the conveyor chain.

Positioning means are also provided at the opening of the vertical slot so that in the event the forward support means is not precisely in its proper position as the flight body is rotated downwardly during attachment, the positioning means centers the vertical slot over its corresponding pin, making attachment quite simple.

The construction of a horizontal slot in the forward support means and a vertical slot in the rear support means is extremely important. In the normal mode of operation of a conveyor, a pushing mechanism such as a vertical plate is attached to the upper surface of the flight body. This plate pushes the article along which is resting on the conveyor surface formed by a succession of flights or top plates. This pushing mechanism is subjected to a force in the opposite direction to conveyor movement, and this force tends to rotate the flight or top plate backwards by pushing the rear support means downward and the forward support means upward. In the present invention, the holding means in the rear support means prevents disengagement of the rear portion of the flight from the corresponding pin, and the horizontal slot in the forward support means virtually eliminates any possibility of the forward support means becoming dislodged from its attaching pin. The force necessary to cause the forward support means to become disengaged would have to be so great as to shear the material of which the forward support means is constructed, rather than merely popping it off as often happens with the prior existing top plates.

In accordance with another aspect of the invention, each hollow roller pin in one embodiment of the drive mechanism or roller chain is a hollow tube which may accept a mounting pin having a radial gripping surface, or being radially resilient, which is inserted into the hollow pin of the drive mechanism. This assembly simplifies attachment and removal of the mounting pins because they may be tapped in or out of the drive mechanism, but once inserted, remain in place because of a tight friction fit. One alternative embodiment of the drive mechanism would be a roller chain made by the original manufacturer with extended solid pins of the correct diameter so that these extended pins would serve as both the roller pins for the chain, and the mounting pins for the conveyor flights.

Other objects, features, and advantages of the present invention will become apparent to those skilled in the art, from a consideration of the following detailed description of a preferred embodiment and the accompanying drawings.

DESCRIPTION OF THE DRAWINGS

FIG. 1 is a top view of a conveyor system including a succession of flights showing an article in position on the conveyor.

FIG. 2 is an external side view taken along the plane II—II of FIG. 1.

FIG. 3 is a section view taken along the plane III—III of FIG. 2.

FIG. 4 is a bottom view of the conveyor system depicted in FIG. 1, taken along the plane IV—IV of FIG. 2.

FIG. 5 is a top view of a double lane conveyor system comprised of two adjoining successions of flights which travel the same speed and direction, and have parallel upper surfaces along the same horizontal plane.

FIG. 6 is a combined section and external side view taken along the plane VI—VI of FIG. 5.

FIG. 7 is a section view taken along the plane VII—VII of FIG. 6.

FIG. 8 is a perspective view of a flight body showing its underside construction.

FIG. 9 is a perspective view of a roll pin depicting its longitudinal slot.

FIG. 10 is a perspective view of a solid pin with a raised center section.

DETAILED DESCRIPTION

A preferred embodiment of a flight for use in a conveyor system is shown in FIGS. 1-8. The drive mechanism for the conveyor is depicted as a multiple-link chain. In FIGS. 2, 3, and 4 the chain is a double-pitch hollow-pin chain of standard construction readily available from a number of manufacturers including Boston Gear and Daido. A single-pitch chain of standard construction is depicted in FIG. 6. The resilient pin 35 of FIG. 9 may be inserted into the hollow pins 33 of the commercially available chain to which the forward and rear support means of the flight are attached. It should be noted that the present invention may alternatively be attached to solid pins inserted into the hollow pins 33 of the chain, as well as to pins like resilient pin 35. The solid or resilient pins may be inserted by the manufacturer of the drive mechanism, or may be inserted by the user, or by anyone else, at the option of the user.

Forward support means 14 are provided for supporting the forward portion of the flight body 10 on the drive mechanism 12. In the preferred embodiment, the forward support means 14 is attached to the body of one flight and includes an extension 16 extending forward of the upper surface 17 of its associated flight body 10 which enables it to engage one pin 13 on the drive mechanism 12 which lies forward and below the associated flight 10 upper surface 17.

The extension 16 includes a horizontal slot 18 for providing a slip-fit to a pin 13. Because of the extension 16, the horizontal slot 18 is adapted to engage a pin 13 located forward and below the forward portion of the flight body as depicted in FIGS. 4 and 6. The width of the horizontal slot 18 is approximately the same as the diameter of the pin 13 for providing a slip-fit to said pin 13. One important advantage of this type of construction is that the flight may be attached either to a double-pitch chain as depicted in FIGS. 2 and 4, or to a single-pitch chain as depicted in FIG. 6.

Rear support means 20 attached to the body of a flight 10 for supporting the rear portion of the flight body 10 on the drive mechanism 12 is shown in FIG. 8. The rear support means 20 includes a vertical slot 22 for receiving a drive mechanism pin 13. This is shown in perspective view in FIG. 8 as well as in FIGS. 2 and 6. Stress relief means 24 for relieving stress at the end of the vertical slot is shown in FIGS. 2, 6 and 8. In this preferred embodiment, the stress relief means 24 is a hole either machined or molded into the end of the vertical slot 22. As the rear support means 20 is attached to or detached from a pin 13, the vertical slot experiences a stress which would tend to be concentrated at the end thereof. The stress relief means 24 distributes the stress in a manner to prevent failure at the end of the vertical slot 22.

The vertical slot 22 also includes holding means 26 for holding and bearing the rear support means 20 to the pin 13 in drive mechanism 12 and for supporting the flight body on the pin extensions. The holding means 26 shown clearly in FIG. 8 is a split part-circular surface or rounded detent in the vertical slot 22 of the same cylindrical dimension as a pin 13 but slightly smaller than the diameter of pin 13 to assure a tight fit between the rear support means 20 and a pin 13. In practice, as the rear support means 20 is attached to a pin 13, it snaps into place holding it securely to the pin 13 with the split partcircular surface bearing loads transmitted through the rear support means.

Attachment of this preferred embodiment of flight body 10 to a chain or drive mechanism of 12 is as follows. First the horizontal slot 18 is slipped over a corresponding pin 13, and then the flight body 10 is rotated downward around the forward pivot point which is pin 13. FIG. 6 shows the cooperative relationship between pin 13, the horizontal slot 18, and extension 16. As the flight body 10 is rotated downward, the vertical slot 22 contacts another pin, and as pressure is applied to the upper surface of the flight body, the rear support means 20 snaps into place with the holding means 26 securely fastened to a rearward pin 13. The horizontal distance between the horizontal slot 18 and the vertical slot 22, including the holding means 26, is constructed to match the distance between the pins of commercially available chains or drive mechanisms 12, whether double-pitch or single-pitch.

Positioning means 28 for positioning the vertical slot over the drive mechanism 12 prior to attachment thereto is shown in FIG. 8 in perspective view and in FIG. 6 in side view. In the preferred embodiment, the positioning means are cam surfaces located at the bottom of the vertical slot 22 which centers the vertical slot 22 and the holding means 26 located therein as the flight body 10 is rotated downward around pin 13 located in the horizontal slot 18. These cam surfaces allow the flight body 10 to be attached quickly because of great care need not be taken to position the flight body 10 with extreme accuracy. If, for example, the horizontal slot 18 is not completely slipped into place over a pin 13, the positioning means 28 will both center the vertical slot 22 over its corresponding pin 13 and push horizontal slot 18 forward onto its corresponding pin.

The rear support means 20 also includes resilient legs 30 for providing the force necessary for a firm friction fit between the holding means 26 and a pin 13 in the drive mechanism 12.

An extremely important and unique feature in the present invention is that the forward support means 14 and the rear support means 20 are located in different vertical zones or planes so that the rear support means 20 may be attached to the same pin 13 as the forward support means 14 of a following flight. This is clearly shown in FIG. 4. In the preferred embodiment, the forward support means 14 is closest to the centerline of the drive mechanism 12, and the rear support means 20 overlaps it in juxtaposition on the outside. This overlapping feature not only allows the present invention to be used on a double-pitch chain, but also insures that it remains securely fastened to the drive mechanism 12 while in use. It would be quite difficult to dislodge a forward support means 14 in the event that it experienced a lateral force tending to force it off.

Shown in FIG. 6 as item No. 31 is the horizontal centerline of the horizontal slot 18 and the horizontal centerline of the holding means 26, which are the same distance from the upper surface of the flight body 10 for maintaining the flight in a horizontal plane as it is moved along by the drive mechanism 12.

A web 32 is provided in the preferred embodiment connecting the forward support means 14 to the rear support means 20 for adding strength. The web 32 includes a cutout 34 placed in a predetermined position so that when the flight body 10 is used in a conveyor system which includes a single-pitch chain, clearance is provided between the web 32 and an intervening pin 13. This is demonstrated in FIG. 6. An advantage to this type of construction is that if standard chain is used which includes pins through each link which extend outwardly from the chain, then the intervening pins need not be removed before attachment of the flight body 10, saving both time and expense.

Tightly fitting pins are depicted in FIGS. 9 and 10. A resilient pin 35 is depicted in FIG. 9. It may be used everywhere a pin 13 is located. It is constructed of a tube 36 having a longitudinal slot 38 cut through its entire length for providing radial spring pressure to the resilient pin 35. A solid pin 37 is depicted in FIG. 10, and includes a center section 39 which is raised to effectively increase the diameter of the solid pin 37 in the raised area. The increased diameter of the center section 39 provides a tight friction fit between the solid pin 37 and the hollow chain pin 33 of a standard chain into which the solid pin 37 is inserted, preventing the pin 37 from vibrating out or being otherwise inadvertantly pushed out. The center section 39 can be knurled, grooved, punched or otherwise caused to increase its diameter. It is also apparent that the pin 37 could be hollow, provided it has a raised center section 39. Any of the pins depicted or discussed may be used in place of a pin 13, and may even be mixed in the same chain. This allows maximum flexibility, because replacement parts may be easily obtained, and any of the pins discussed can be inserted or removed by either the chain manufacturer or the user.

Pushing means 40 is attached to flight upper surface 17 and is used to push an article in the direction of conveyor movement is depicted in FIGS. 2 and 6 in side view. In the preferred embodiment, the pushing means 40 is a bracket constructed of any suitable rigid material such as plastic or metal which is attached to certain flights 10 at predetermined distances along the conveyor system depending upon the size of the article being transported. FIGS. 1 and 2, and 5 show an article 41 in phantom lines being transported by a succession of flights 10 and being moved along by pushing means 40. The pushing means 40 is attached to the flight body by fastening means 42 shown in FIGS. 2, 6 and 7. Those flight bodies 10 selected to accept the attachment of one pushing means 40 will each have corresponding holes 44 into which or through which the fastening means 42 is inserted. The fastening means 42 may be a self-threading screw, bolt, rivet, or any other means deemed appropriate for the particular usage. It is contemplated that, in operation, the flight body 10 to which the pushing means 40 is attached may easily and quickly be readjusted depending upon the dimensions of the article 41 being transported. Because the flight body 10 does not require any special tools for removal or attachment, those flight bodies 10 selected to accept pushing means 40 may be easily and quickly switched, and therefore the pushing means 40 may be located or re-located along the succession in any position desired. It can clearly be seen from FIG. 6 that one flight 10 may be removed without disturbing any of the others and may also be attached without having to remove any of the adjacent flights 10. This allows for maximum flexibility, quick repairs when needed, and quick modification of the system.

The importance of the horizontal slot 18 in the forward support means 14 can readily be seen in FIG. 2. As an article 41 is being moved along by the pushing means 40, in the direction of vector 46 shown in FIG. 2, a corresponding rearward force is exerted on the pushing means 40 which translates into a torque vector 48 also shown in FIG. 2. Analyzing the forces at each pin, one can see that the rear support means 20 is driven downward, fastening itself even more securely to its corresponding pin 13. The horizontal slot 18 tends to be forced upward against its corresponding pin 13. Because of the horizontal configuration of the slot 18, the forward support means 14 does not have a tendency to become detached from its corresponding pin 13. In fact, in order to dislodge the forward support means 14 from the pin 13, the extension 16 or the entire forward support means 14 would have to be sheared, requiring a force much greater than that experienced by a flight body 10 in normal operation even under very high loading.

In FIGS. 5 and 7 are shown a modification to the pushing means 40, which is an arm 50 extending horizontally beyond the edge of the upper surface 17 of the flight body 10 on one of the adjoining conveyors to a location over the top of the adjoining conveyor to be used for pushing one or more articles wider than the width of one conveyor comprised of the flights 10 to which the pushing means 40 is attached. The arm 50 may extend in only one direction as shown in FIGS. 5 and 7, or it may extend in both directions, and it may be of any length deemed appropriate.

FIGS. 5 and 7 show a double-lane conveyor system comprised of two successions of flights adjoining one another, moving in the same direction and having upper surfaces 17 located in the same horizontal plane. Referring to FIG. 5, depicted are the centerlines 56 and 58 of the drive mechanisms 12 which move each respective succession of flights. More than two successions of flights may also be used. It would even be possible to extend the arm 50 over a stationary smooth surface on which the article 41 could be slidingly pushed along. Employing this design of an arm 50 on one conveyor which extends sideways over the top of the adjoining conveyor allows for quick and easy adjustment of the space between one arm 50 and a preceding pushing means 40. One conveyor may be moved relative to the other by rotation of the chain sprockets, causing the spaces to be made narrower or wider between successive arms 50 and pushing means 40. This method, rather than having the pushing means 40 attached to adjacent flights in each adjoining succession allows for easier removal and attachment of flights 10, pushing means 40, and arm 50. Additionally, such adjustment confines the article in a precise location relative to other adjoining conveyors, which in turn will allow a sliding transfer from one conveyor to an adjoining conveyor at right angles to the direction of travel while both conveyors are in motion as long as each adjoining conveyor is moving at the same speed. If high loads are expected to be encountered, and adjustability of product spaces is not needed, the arm itself may be fastened to the adjacent conveyor flight body 10 in any suitable manner.

A flight body 10 constructed essentially as depicted in the drawings may be constructed by a unitary molding process without the necessity of drilling holes or milling slots or cutouts. This includes all of the features found in the forward support means 14, the rear support means 20, and the inter-connecting web 32. All of these items and the features they contain may be molded as part of the upper surface 17 of the flight body 10, and even the holes 44 may be premolded in any location desired. One suitable material for the flight bodies 10 could be Delrin impregnated with glass, which has a low coefficient of friction. Such a material is advantageous because in the usual conveyor system, the succession of flights would be supported by conveyor supports 54 as shown in FIG. 7. The flight bodies 10 would slide along the conveyor supports which would take a significant portion of the downward force exerted by the article being carried. However, the flight bodies 10 may be constructed of a variety of other plastics or fibers, and could also be made of metal with the forward support means 14, the rear support means 20, and the additional features being welded or brazed together, or machined after initial casting or forging. The material chosen would depend upon the environment in which the flight body would be operating; differing materials being chosen if corrosive or reactive conditions might be present.

It is to be understood that the disclosed apparatus is merely illustrative of the principles of the present invention which could be implemented by other types of structures constructed of different materials as discussed above. Accordingly, the scope of the present invention is to be determined in accordance with the appended claims.

What is claimed is:

1. In a conveyor system made up of a succession of flights for transporting articles, each flight having a body providing an upper flight surface with leading and trailing edges and upon which the articles are supported, each flight being supported and moved along by a chain having a plurality of chain pins with pin extensions projecting outwardly from the chain sides, the improvement comprising in combination:

rear support means and forward support means depending from said flight body for supporting the body on spaced pin extensions;

said rear support means including first pin engaging means operable to receive said pin extensions when said flight body is moved relatively toward said pin extension in a direction normal to said flight surface;

said pin engaging means including one or more pairs of spaced resilient legs depending from the flight body and each pair providing an opening for receiving the pin extension of one of said pins;

holding and bearing means in said opening on each pair of said legs for holding a pin extension received in said opening with a snap fit and providing bearing support for loads transmitted through said rear support means;

said forward support means having second pin engaging means extending forwardly of the leading edge of the flight body surface and engaging pin extensions on said chain engaged by the rear support means of the adjacent flight body forwardly thereof, said second pin engaging means being provided with a forwardly directed opening for receiving a pin extension when said flight body is moved relatively toward said pin extension in a forward direction generally parallel to the flight body surface;

said leading and trailing edges of said flight body surface lying in vertical planes normal to said surface and rearwardly of said openings in the first and second pin engaging means, respectively.

and a web connecting the forward and rear support means, said web having one or more cutouts for providing clearance between the web and an intermediate pin located between the pins attached to the forward and rear support means.

2. The improvement to the conveyor system of claim 1 wherein the rear support means further comprises:
stress relief means between said bearing means and said flight surface for relieving stress in said pair of legs.

3. The improvement to the conveyor system of claim 1 wherein the rear support means further comprises:
positioning means including at least one cam face on said pair of legs for positioning the rear support means over a pin prior to attachment thereto and to assist engagement of the second pin engagement means with its associated pin.

4. The improvement to the conveyor system of claim 1 wherein:
said forwardly directed opening has its horizontal centerline the same distance from the flight surface of the flight as the distance from the flight surface to the axis of a pin extension received in the rear support means for maintaining the flight in a horizontal plane.

5. The improvement in the conveyor system of claim 1 wherein said chain includes a plurality of chain links assembled together by hollow linkage pins, said chain pins comprising tightly fitting pins press-fitted into selected ones of said hollow linkage pins, said tightly fitting pins extending laterally outwardly from said linkage pins, so that said flights are mounted on the chain by their attachment to said tightly fitting pins.

6. A flight attached to a drive mechanism, said drive mechanism having a plurality of pins, said flight having a body and an upper surface with leading and trailing edges comprising:
rear support means attached to and entirely below and forwardly of the trailing edge of the flight surface the body of one or more of said flights for supporting the rear portion of the flight body on said drive mechanism pins;
forward support means attached to the body of one or more of said flights for supporting the forward portion of the flight body on said drive mechanism pins and forwardly of the leading edge of the flight surface;
said rear support means located in a planar zone laterally spaced from the planar zone of the forward support means for allowing a forward support means of a given flight to be attached to one or more pins also supporting the rear support means of a an adjacent flight, whereby the forward and rear support means of adjacent flights are in juxtaposition;
one or more pairs of resilient legs in said rear support means depending from the flight body, said legs defining a vertical slot for receiving one or more drive mechanism pins;
said forward support means having a horizontal slot for providing a slip fit to one or more of said pins;
an extension to said forward support means extending forwardly of the leading edge of the flight surface and engaging one or more pins on said drive mechanism which lie forwardly and below the associated flight upper surface;
said horizontal slot having its horizontal centerline the same distance from the upper surface of the flight as the distance from the upper surface to the axis of the pin engaged by the holding means in the rear support means for maintaining the flight in a horizontal plane;
a pair of spaced webs connecting the forward and rear support means for adding strength; and
said webs having one or more cutouts for providing clearance between the webs and one or more intermediate pins located between the pins supporting the rear and forward support means.

7. In a conveyor system made up of a succession of flights for transporting articles, each flight having a body providing an upper surface with leading and trailing edges upon which the articles are supported, and each flight being supported and moved along by a chain having a plurality of chain pins extending outwardly from the chain sides, the improvement comprising the provision of:
rear support means attached to and entirely below and forwardly of the trailing edge of one or more of said flights for supporting the rear portion of the flight body on one or more of said pins;
pin engaging means in said rear support means operable to receive a horizontally disposed pin when said flight is moved relatively toward said pin in a direction generally normal to said upper surface;
one or more pairs of resilient legs in said pin engaging means dependent from the flight body, said legs including bearing means and defining a vertical slot for receiving said pin to contact said bearing means;
forward support means attached to the body of one or more of said flights for supporting the forward portion of the flight body on one or more of said pins, said forward support means extending forward of the leading edge of the upper surface of its associated flight body, and engaging pins on said chain which lie forward and below said associated flight upper surface;
second pin engaging means in said forward support means for receiving a horizontally disposed pin when said flight is moved relatively toward said pin in a direction generally parallel to said upper surface;
said second pin engaging means is provided with a horizontal slot for providing a slip fit to one or more of said pins,
and a web connecting the forward and rear support means, said web having one or more cutouts for providing clearance between the web and an intermediate pin located between the pins attached to the forward and rear support means.

* * * * *